(12) United States Patent
Jennings

(10) Patent No.: US 10,894,587 B2
(45) Date of Patent: Jan. 19, 2021

(54) PREFORMED FOUNDATION SUPPORT FOR A MARINE VESSEL GYRO-STABILIZATION SYSTEM

(71) Applicant: William Walsh Jennings, Ledyard, CT (US)

(72) Inventor: William Walsh Jennings, Ledyard, CT (US)

(*) Notice: Subject to any disclaimer, the term of this patent is extended or adjusted under 35 U.S.C. 154(b) by 31 days.

(21) Appl. No.: 16/027,420

(22) Filed: Jul. 5, 2018

(65) Prior Publication Data
US 2020/0010159 A1 Jan. 9, 2020

(51) Int. Cl.
| | |
|---|---|
| *B63B 39/04* | (2006.01) |
| *B29C 70/02* | (2006.01) |
| *B29C 70/68* | (2006.01) |
| *B63B 17/00* | (2006.01) |
| *B29K 309/08* | (2006.01) |
| *B29L 31/30* | (2006.01) |
| *B29L 31/00* | (2006.01) |
| *B29K 105/08* | (2006.01) |

(52) U.S. Cl.
CPC ............ *B63B 39/04* (2013.01); *B29C 70/023* (2013.01); *B29C 70/682* (2013.01); *B29C 2791/002* (2013.01); *B29K 2105/0809* (2013.01); *B29K 2309/08* (2013.01); *B29K 2715/003* (2013.01); *B29L 2031/3067* (2013.01); *B29L 2031/7502* (2013.01); *B63B 2017/0054* (2013.01); *B63B 2221/10* (2013.01); *B63B 2231/52* (2013.01)

(58) Field of Classification Search
CPC combination set(s) only.
See application file for complete search history.

(56) References Cited

U.S. PATENT DOCUMENTS

| | | | | |
|---|---|---|---|---|
| 769,693 | A * | 9/1904 | Forbes | B63B 39/04 74/5.22 |
| 1,330,503 | A * | 2/1920 | Thompson | B63B 39/04 74/5.22 |
| 2,547,968 | A * | 4/1951 | Paulus | G05D 1/0808 74/5.6 D |
| 3,158,340 | A * | 11/1964 | Sellers | G01C 21/18 244/79 |
| 3,576,134 | A * | 4/1971 | Fersht | B63B 39/04 74/5.22 |
| 4,118,707 | A * | 10/1978 | Yoshida | H01Q 1/18 33/321 |
| 4,150,580 | A * | 4/1979 | Silkebakken | A63B 21/22 446/233 |

(Continued)

*Primary Examiner* — Monica E Millner
(74) *Attorney, Agent, or Firm* — John J. Daniels, Esq.

(57) ABSTRACT

A preformed foundation support for a vessel gyro-stabilization system, comprises at least three of a first side support, a second side support, a third side support, and a fourth side support. The side supports define an opening for accommodating at least a portion of a vessel gyro-stabilization system, and the side supports comprise a cuttable portion for custom fitting the preformed foundation support in a vessel. The preformed foundation support structure is installed in the vessel by cutting the cuttable portion of the preformed foundation support for custom fitting the preformed foundation support to the structure support of the vessel. The preformed foundation support structure can be manufactured as a molded fiberglass structure.

7 Claims, 12 Drawing Sheets

(56) References Cited

U.S. PATENT DOCUMENTS

| | | | | |
|---|---|---|---|---|
| 4,448,086 A * | 5/1984 | Kennel | .................. | G01C 19/04 |
| | | | | 74/5 R |
| 5,778,735 A * | 7/1998 | Groves | ................... | G05G 1/10 |
| | | | | 74/572.12 |
| 5,871,249 A * | 2/1999 | Williams | ................ | B66C 13/08 |
| | | | | 294/81.4 |
| 6,014,911 A * | 1/2000 | Swett | .................. | F16F 15/3153 |
| | | | | 74/572.12 |
| 6,401,556 B1 * | 6/2002 | Hamady | ................ | A63B 21/22 |
| | | | | 482/44 |
| 6,973,847 B2 * | 12/2005 | Adams | ................... | B63B 39/04 |
| 7,240,630 B2 * | 7/2007 | Akers | .................... | B63B 39/04 |
| | | | | 114/122 |
| 8,456,159 B2 * | 6/2013 | Polzer | .................. | G01R 33/022 |
| | | | | 324/246 |
| 9,381,981 B2 * | 7/2016 | Chiesa | ................... | G01C 19/02 |
| 9,586,660 B2 * | 3/2017 | Ulgen | ................... | B63B 39/04 |
| 10,449,818 B2 * | 10/2019 | Koch | .................... | B60G 13/02 |
| 2003/0029367 A1 * | 2/2003 | Umemura | ............... | F16F 9/145 |
| | | | | 114/121 |
| 2007/0272142 A1 * | 11/2007 | Nedwed | ................. | B63B 39/04 |
| | | | | 114/122 |

* cited by examiner

PREFORMED FOUNDATION SUPPORT FOR A MARINE VESSEL GYRO-STABILIZATION SYSTEM

TECHNICAL FIELD

The exemplary and non-limiting embodiments of this invention relate generally to systems, methods, and devices for a preformed foundation support for a marine vessel gyro-stabilization system, and, more specifically, relate to a customizable foundation support for a marine vessel gyro-stabilization system having a cuttable portion for facilitating quick, accurate and secure installation of the gyro-stabilization system within the marine vessel.

BACKGROUND

This section is intended to provide a background or context to the exemplary embodiments of the invention as recited in the claims. The description herein may include concepts that could be pursued but are not necessarily ones that have been previously conceived, implemented or described. Therefore, unless otherwise indicated herein, what is described in this section is not prior art to the description and claims in this application and is not admitted as prior art by inclusion in this section.

A marine gyrostabilizer reduces the rolling of boats and ships in waves. Typically, a flywheel mounted in a gimbal frame allows for two of the three possible rotational degrees of freedom. This gimbal frame is rigidly mounted to the hull of the vessel, and the flywheel gimbaled within the frame. Usually, the device is located in the engine room of the vessel, but other installation locations are possible.

To oppose the tendency of the rolling motion caused by waves, wind and water movement, a gyro-stabilizing torque is created by the spinning flywheel. Waves, wind and water movement cause the vessel to roll, and this rolling motion and the spinning flywheel cause a precession motion to be generated that creates the stabilizing torque.

The roll stabilizing torque is directly created in response to the rolling motion itself, so there is no time delay, or lag, between the wave induced rolling motion and the stabilizing torque produced by the precession of the spinning flywheel. The result is a smooth and consistent application of stabilizing torques.

Some examples of marine gyrostabilizers use a vacuum encapsulation of a flywheel that spins at speeds of about 10,000 rpm. When the boat rolls, the gyro tilts fore and stern (precesses), producing a powerful gyroscopic torque to port and starboard that counteracts the boat roll.

The installation of a marine gyrostabilizer is a labor-intensive process. Typically, the location for the installation is first determined depending on available space, the physical size of the marine gyrostabilizer, the preferences of the boat owner, and other factors such as the location of structural elements of the vessel.

Once the location for the installation is determined, precise measurements to determine how available anchor points, usually pre-existing portions of the vessels infrastructure, can be utilized to mechanically fix the marine gyrostabilizer to transfer force effectively to the hull of the vessel.

For example, to install a marine gyrostabilizer typically requires a high degree of customization and involves multiple steps to measure, cut, build and install a foundation that fits into the specific space, between pre-existing boat infrastructure, etc. This customization means that each installation is a very labor intensive endeavor, requiring a new foundation structure to be designed and built for every marine gyrostabilizer installation.

Accordingly, there is an unmet need for a solution that enables consistent and accurate installing of a marine gyro-stabilizer while limiting labor intensive measurement and custom fitting of shims, spacers, support structures, etc.

SUMMARY

The below summary section is intended to be merely exemplary and non-limiting.

In accordance with an aspect of the invention, a preformed foundation support is provided for a vessel gyro-stabilization system. The preformed foundation support comprises at least three of a first side support, a second side support, a third side support, and a fourth side support. The side supports define an opening for accommodating at least a portion of a vessel gyro-stabilization system, and the side supports comprise a cuttable portion for custom fitting the preformed foundation support in a vessel.

In accordance with another aspect of the invention, a method is provided for a preformed foundation support structure installed in a vessel. The method includes providing a preformed foundation support for a vessel gyro-stabilization system. The preformed foundation support comprises at least three of a first side support, a second side support, a third side support, and a fourth side support. The side supports, which can be a combination of walls and/or braces, define an opening for accommodating at least a portion of a vessel gyro-stabilization system. The preformed foundation support is fixed to a structure support of the vessel. The vessel gyro-stabilization system is then fixed to the preformed foundation support. The preformed foundation support can be easily customized by cutting a cuttable portion of the preformed foundation support for custom fitting the preformed foundation support to the structure support of the vessel.

In accordance with another aspect of the invention, a method is provided for forming a preformed foundation support for a vessel gyro-stabilization system. The method comprises the steps of: providing a mold having a mold cavity defining a box shaped cavity having a first side support cavity, a second side support cavity, a third side support cavity, and a fourth side support cavity; and laying up a fiberglass shell within the mold cavity, wherein the fiberglass shell comprises resin impregnated fiberglass cloth and forms a box shaped structure, and wherein the box shaped structure includes a cuttable portion for custom fitting the preformed foundation support in a vessel.

The foregoing and other problems are overcome, and other advantages are realized, by the use of the exemplary embodiments of this invention.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Below are provided further descriptions of various non-limiting, exemplary embodiments. The exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 1:
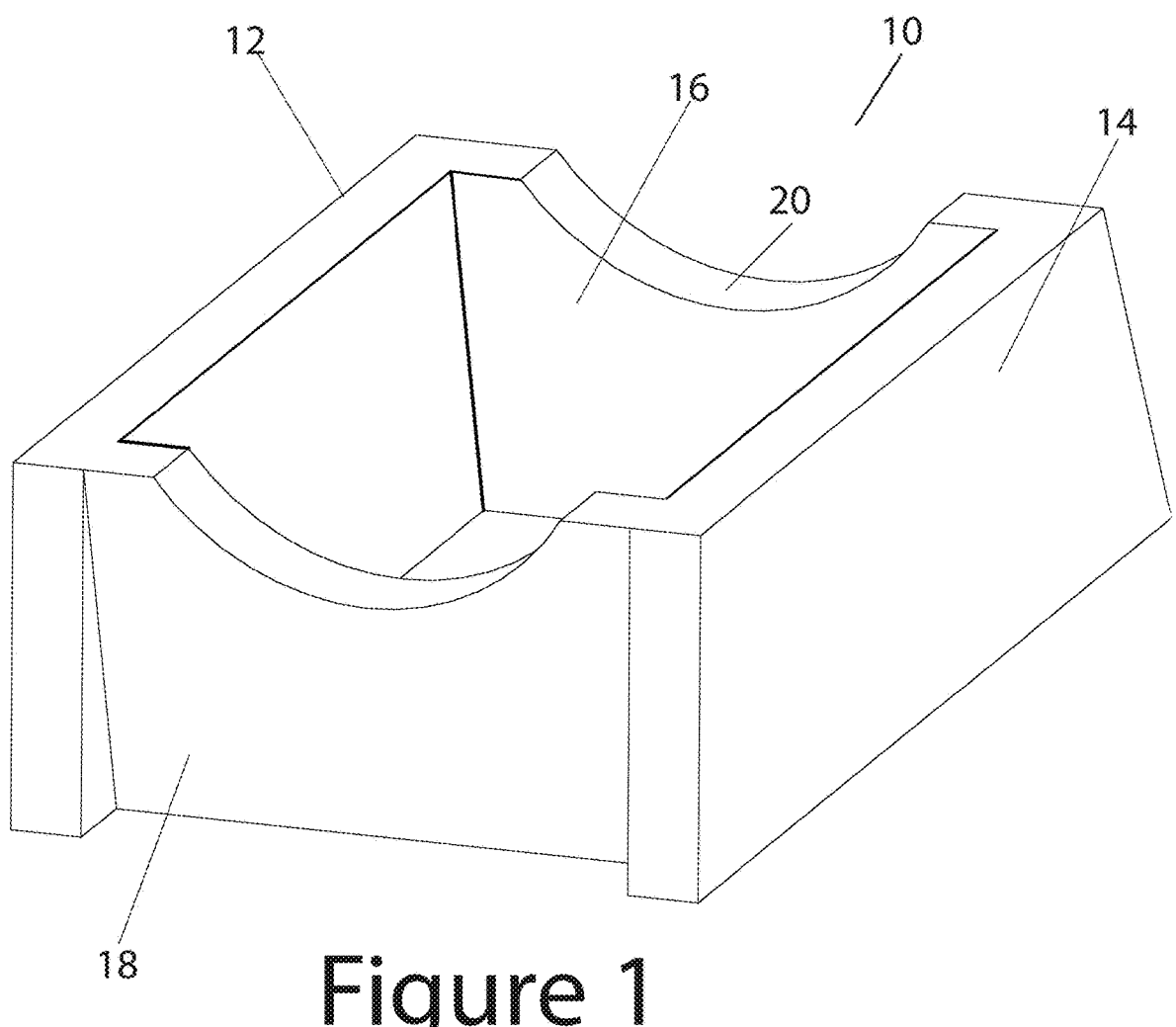
FIG. 1 is a perspective view of an untrimmed foundation support for a vessel gyro-stabilization system.
Figure 2:
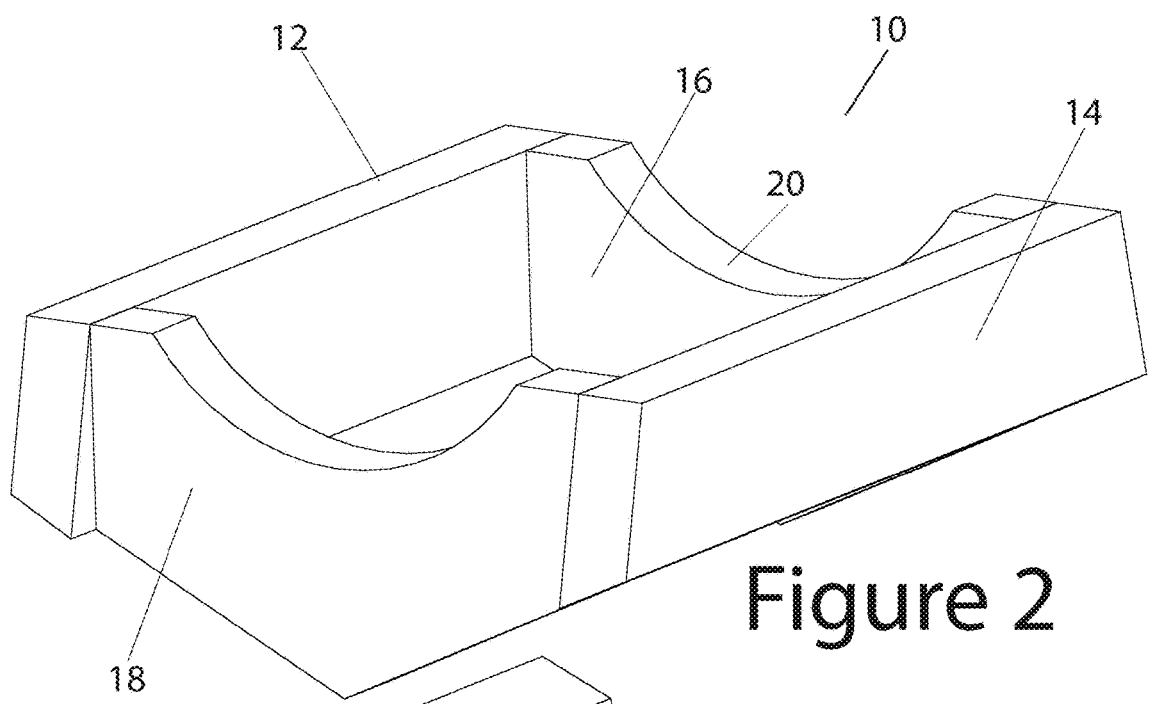
FIG. 2 is a perspective view of a trimmed foundation support for a vessel gyro-stabilization system.
Figure 3:
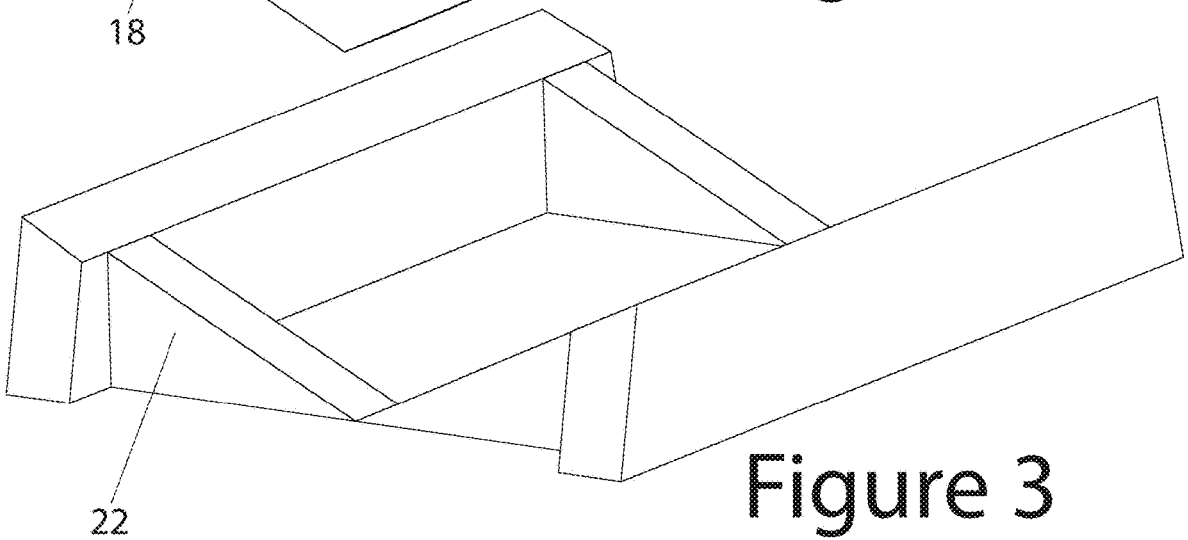
FIG. 3 is a perspective view of the trimmed waste from the embodiment of the inventive foundation support for a vessel gyro-stabilization system.
Figure 4:
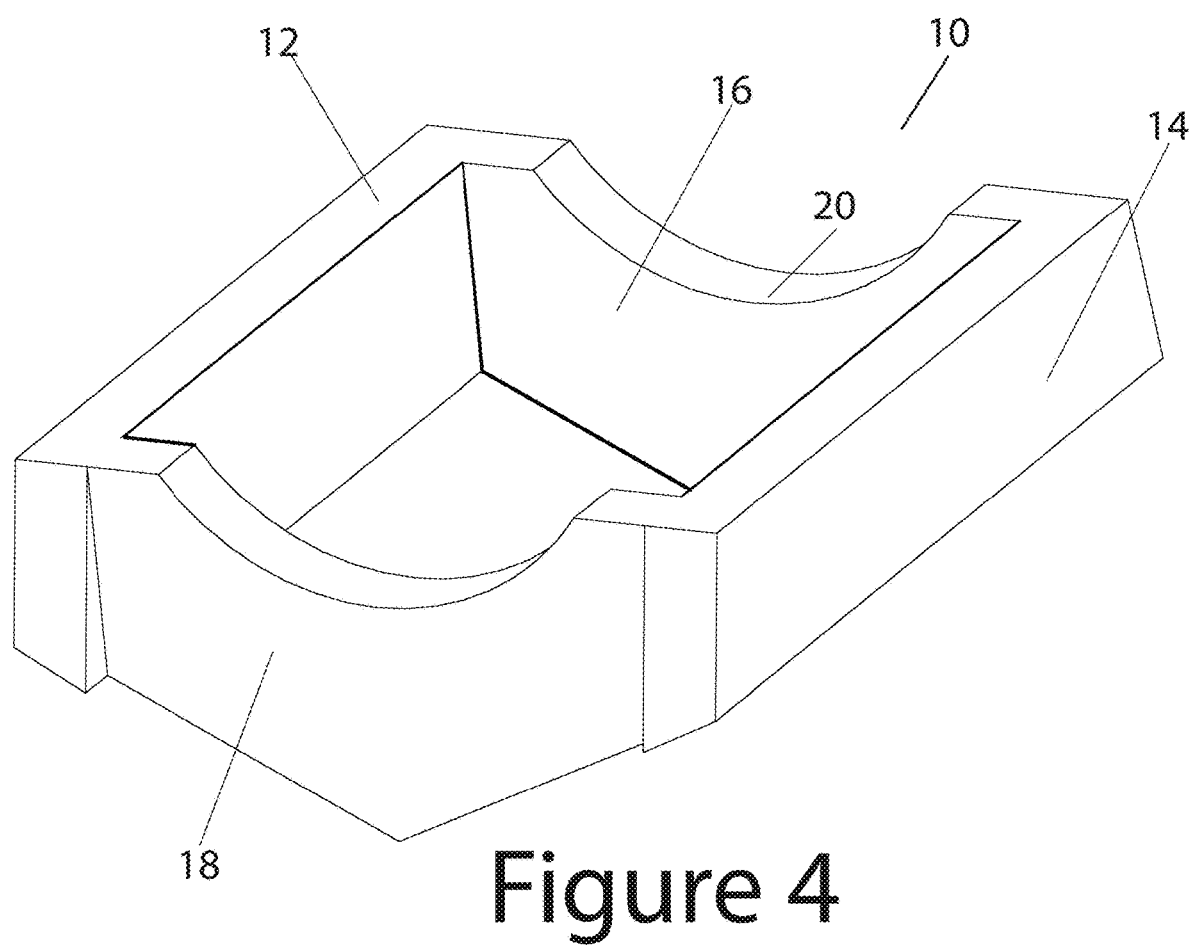
FIG. 4 is an isolated perspective view of the trimmed foundation support for a vessel gyro-stabilization system.

FIG. 1 is a perspective view of an untrimmed foundation support 10 for a vessel gyro-stabilization system. FIG. 2 is a perspective view of a trimmed foundation support 10 for a vessel gyro-stabilization system. FIG. 3 is a perspective view of the trimmed waste from the embodiment of the inventive foundation support 10 for a vessel gyro-stabilization system. FIG. 4 is an isolated perspective view of the trimmed foundation support 10 for a vessel gyro-stabilization system.

There are a number of significant advantages to using the inventive preformed foundation support when installing a gyro-stabilization system into a vessel. Conventional installations requires a custom made foundation support that is usually built as a one-off structure that requires an often iterative process of measurement, cutting, building, remeasurement, etc., to get the fit for the foundation customized for the particulars of the vessel. Most if not all of the installation work can be carried out while the vessel remains in the water.

Since there are many types, brands, makes and models of vessels, an installation of a gyro-stabilization system often has to take up to six weeks, with the vessel out of the water. Among the advantages of the inventive preformed foundation support is faster installation time, possible less than a week which enables an installer to increase their sales volume and increase competitiveness. Also, since the inventive preformed foundation support can be sized to a particular vessel size range and/or type, the installation will tend to go more smoothly with less labor and less labor skills as compared with the conventional highly customized installation.

The inventive preformed foundation support can be used with OEM or refit application, and colorant added to the fiberglass resin or smooth gelcoat finish, and/or paint used to color match as desired.

Also, backlighting can be incorporated in the preformed foundation support for interesting lighting effects and/or to indicate that the gyro-stabilization system is working.

Cardboard jigs may be included to help in determining location and size requirements. Also, measuring tools may be included to assist in marking the unit for cutting to fit. The inventive preformed foundation support may include most if not all of the parts needed to install, and may be sold precut to size and labelled as to what location and order to apply. In this case, with the plumbing and electric nearly completely assembled into the preformed foundation, the installer may need to only install custom connections for plumbing and wiring.

The inventive preformed foundation support can be installed in near any location including inside consoles and leaning posts, with installations that can be the lowest profile possible to fit into tight spaces easier.

In accordance with an embodiment of the invention, a preformed foundation support 10 is provided for a vessel gyro-stabilization system. The preformed foundation support 10 comprises a first side support 12, a second side support 14, a third side support 16, and a fourth side support 18. The mold may be configured and dimensioned so that at least one of the side supports includes a semi-circular cutout 20 for accommodating a spherical gyroscope housing of the vessel gyro-stabilization system. The side supports define an opening for accommodating at least a portion of the vessel gyro-stabilization system, and the side supports comprise a cuttable portion 22 for custom fitting the preformed foundation support 10 in a vessel.

The preformed foundation support 10 is for facilitating the installation of a marine gyrostabilizer used to reduce the rolling of boats and ships in waves where a flywheel mounted in a gimbal frame is rigidly mounted to the hull of the vessel. The inventive preformed foundation support 10 facilitates the installation of the gyro-stabilization system whether located in the engine room of the vessel, or any other installation location.

The tendency of the rolling motion caused by waves, wind and water movement is resisted by the gyro-stabilizing torque created using a very quickly spinning, heavy flywheel. The heavy gyro-stabilization system must be installed so as to be rigidly fixed to the vessel, inside the hull or on the deck, and oriented so that when waves, wind and water movement cause the vessel to roll, the rolling motion and the spinning flywheel cause a precession motion to be generated that creates the stabilizing torque.

To do this installation effectively, the first and second side supports of the preformed foundation support 10 are longitudinally disposed girders locatable during installation of the preformed foundation support 10 parallel to a longitudinal center line of the vessel running from bow to stern, the girders support the vessel gyro-stabilization system in the vessel.

To create a strong, easily installed box shape, the girders are walls making up the first and second side supports and the transverse bracket are walls making up the third and fourth side supports. The transverse brackets are disposed substantially perpendicular to the girders, forming an opening for accommodating parts of the vessel gyro-stabilization system with the girders supporting anchor points of the vessel gyro-stabilization system.

Since the roll stabilizing torque is directly created in response to the rolling motion itself, the preformed support structure must be robust and rigid to immediately transfer strong forces between the vessel and the gyro-stabilization system.

In order to facilitate onsite customizable installations, and to help reduce labor, reduce mistakes, and avoid improper installation, the inventive preformed foundation support 10 needs to be easily cuttable to provide a custom fit within the confines of a particular vessel. Also, the materials in the construction of the preformed foundation support 10 needs to be able to withstand harsh marine environmental conditions, which typically include heavy salt laden moisture, salt water, fuels, oil, grit, and other corrosive and destructive conditions.

Figure 5:
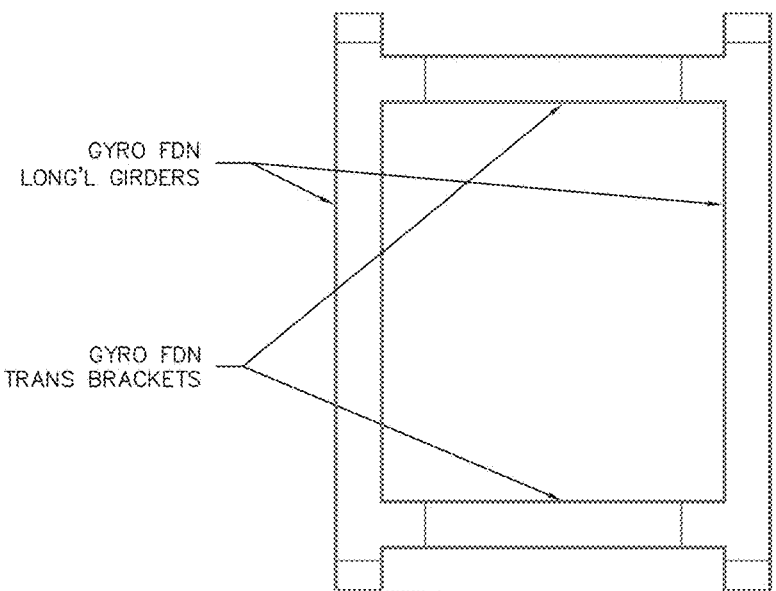
FIG. 5 is a top plan view of an embodiment of the inventive foundation support for a vessel gyro-stabilization system.
Figure 7:
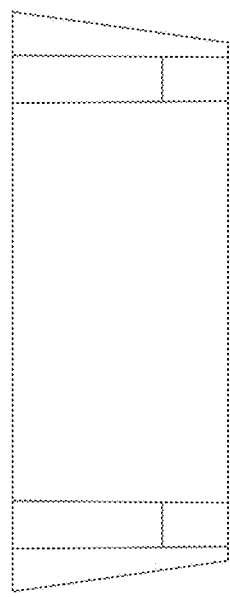
FIG. 7 is a side view of the embodiment of the inventive foundation support for a vessel gyro-stabilization system.
Figure 6:
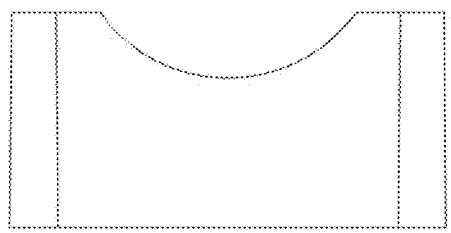
FIG. 6 is an end view of the embodiment of the inventive foundation support for a vessel gyro-stabilization system.

FIG. 5 is a top plan view of an embodiment of the inventive foundation support for a vessel gyro-stabilization system. FIG. 6 is an end view of the embodiment of the inventive foundation support for a vessel gyro-stabilization system. FIG. 7 is a side view of the embodiment of the inventive foundation support for a vessel gyro-stabilization system. The embodiment shown herein is exemplary of the inventive preformed foundation support. There are a variety of different sized gyro-stabilization systems made by a number of manufacturers. The same general structure and advantages can be achieved for different sized and shaped gyro-stabilization systems as described with regard to the exemplary embodiment shown in the drawings. The inventive preformed foundation support can be sized to a gyro-stabilization system that is custom fit into a particular vessel size range and/or type.

Figure 8:
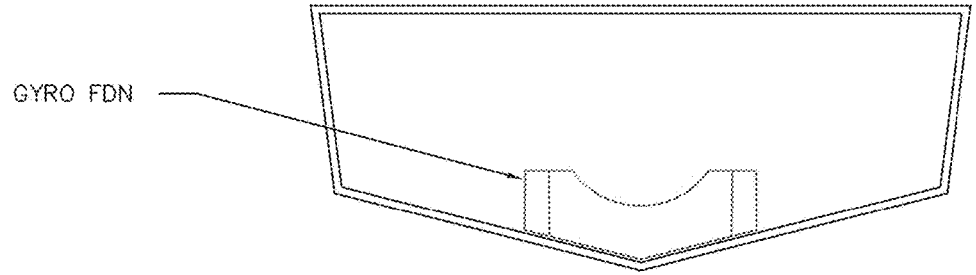
FIG. 8 shows an embodiment of the inventive foundation support for a vessel gyro-stabilization system installed in the hull of a vessel.
Figure 9:
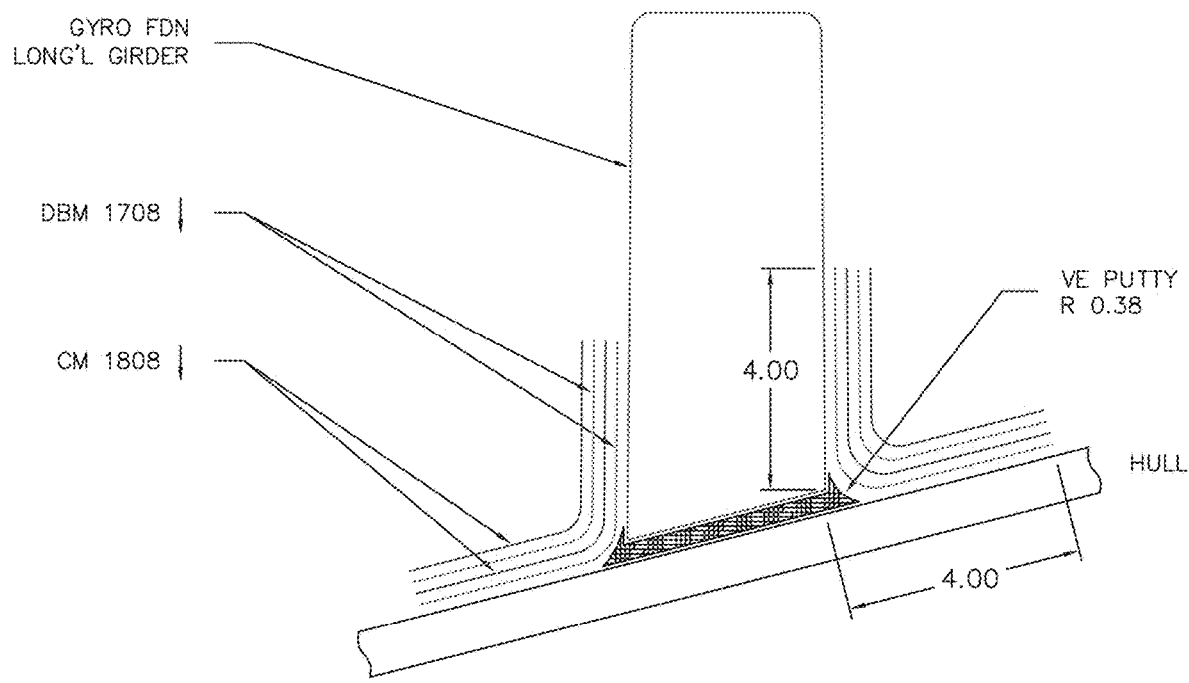
FIG. 9 is a dimensioned sectional view of an embodiment of the inventive foundation support for a vessel gyro-stabilization system showing transverse bracket details.

FIG. 8 shows an embodiment of the inventive foundation support 10 for a vessel gyro-stabilization system installed in the hull of a vessel. FIG. 9 is a sectional view of an embodiment of the inventive foundation support 10 for a vessel gyro-stabilization system showing transverse bracket details.

The molded preformed foundation support 10 is installed by bonding and tabbing to the hull of a vessel. Measurements are first taken of the installation location of the vessel. The longitudinal girders and transverse brackets are cut using a saw blade so that the cuttable portion 22 of the box shaped structure formed by the side supports are trimmed to fit in the installation location. As shown in FIG. 8 and FIG. 9, the trimmed preformed foundation support 10 is bonded to the hull using putty, resin, hardener, Cabosil and/or chopped glass fibers. In this example installation, fiberglass DBM 1708 Knytex Biaxial +/−45 degree fabric and CM 1808 0/90 degree fiberglass tape are used to create strong bonding between the foundation support 10 and the pre-existing hull structure. The longitudinal girders can be tabbed to the hull, for example, with alternating plies of DBM 1708 E-Glass biaxial (e.g. Vectorply E-BSM 1708 or equivalent) and CM 1808 E-glass biaxial 0/90 degree (Vectorply E-LTM 1808 or equivalent), with 4 plies that are 8" wide (4" on girders, 4" on hull). The transverse brackets can be tabbed to the hull, for example, with alternating plies of DBM 1708 and CM 1808, 3 plies total, 8" wide (4" on brackets, 4" on hull).

Figure 10:
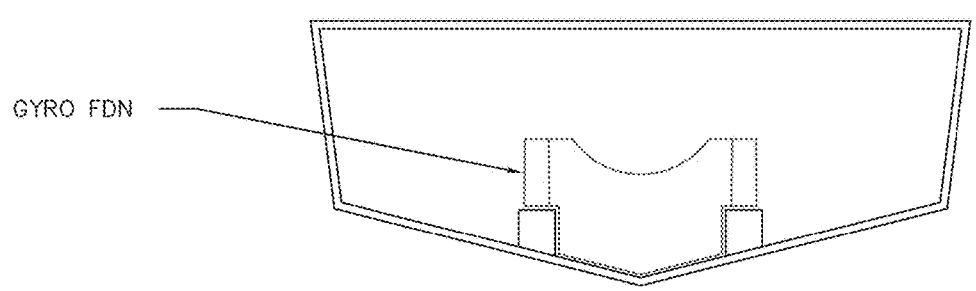
FIG. 10 shows an embodiment of the inventive foundation support for a vessel gyro-stabilization system installed in the hull of a vessel over existing hull structure.
Figure 11:
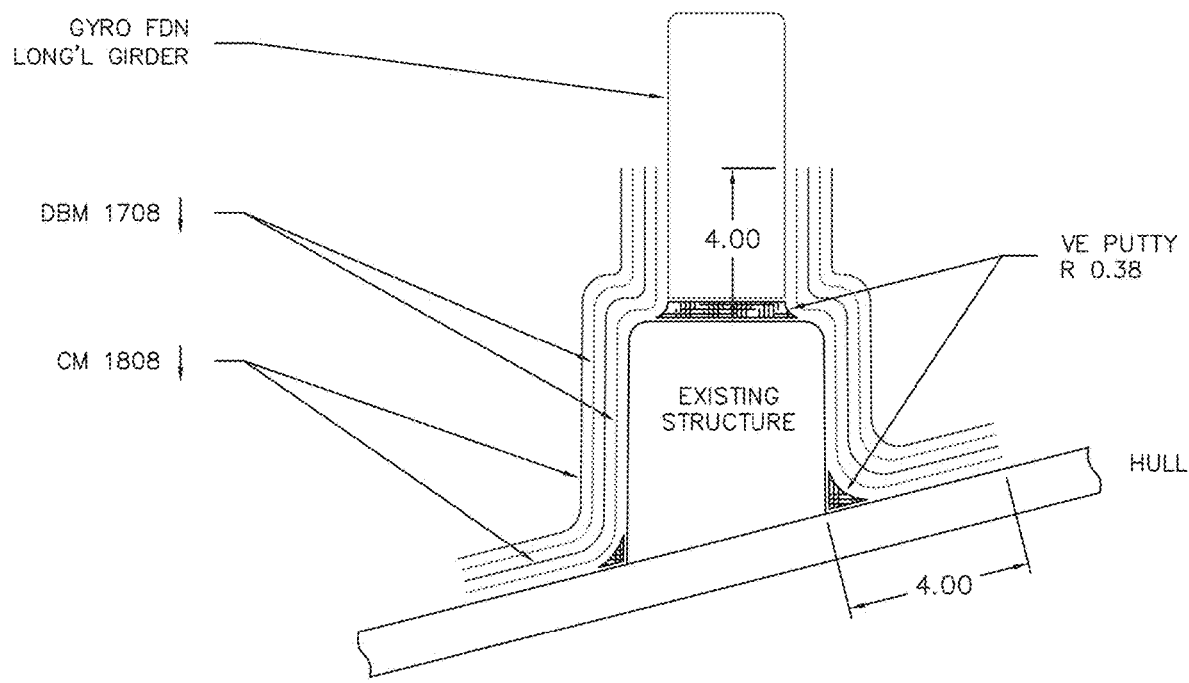
FIG. 11 is a dimensioned sectional view of an embodiment of the inventive foundation support for a vessel gyro-stabilization system showing transverse bracket details as installed over existing hull structure.

FIG. 10 shows an embodiment of the inventive foundation support 10 for a vessel gyro-stabilization system installed in the hull of a vessel over existing hull structure. FIG. 11 is a sectional view of an embodiment of the inventive foundation support 10 for a vessel gyro-stabilization system showing transverse bracket details as installed over existing hull structure. The preformed foundation support 10 is trimmed by cutting the side supports so that the longitudinal girders and the transverse brackets fit over and/or between existing hull structures, such as stiffeners and frames. Similar to the installation shown in FIG. 8 and FIG. 9, the longitudinal girders and the transverse brackets can be tabbed to the existing hull structures using fiberglass DBM 1708 Knytex Biaxial +/−45 degree fabric and CM 1808 0/90 degree fiberglass tape, putty, resin, hardener, Cabosil and/or chopped glass fibers.

Figure 12:
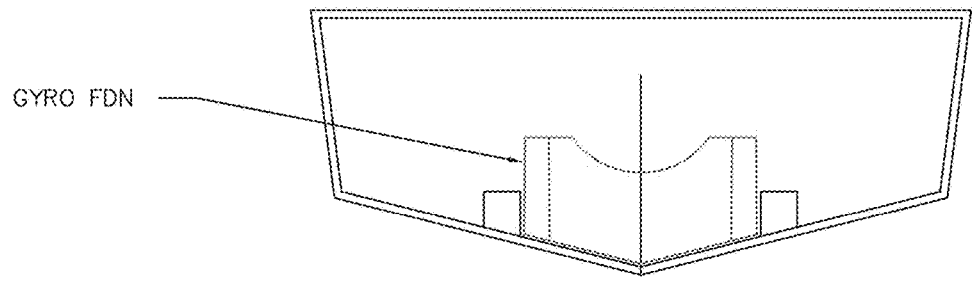
FIG. 12 shows an embodiment of the inventive foundation support for a vessel gyro-stabilization system installed in the hull of a vessel between existing hull structure.
Figure 13:
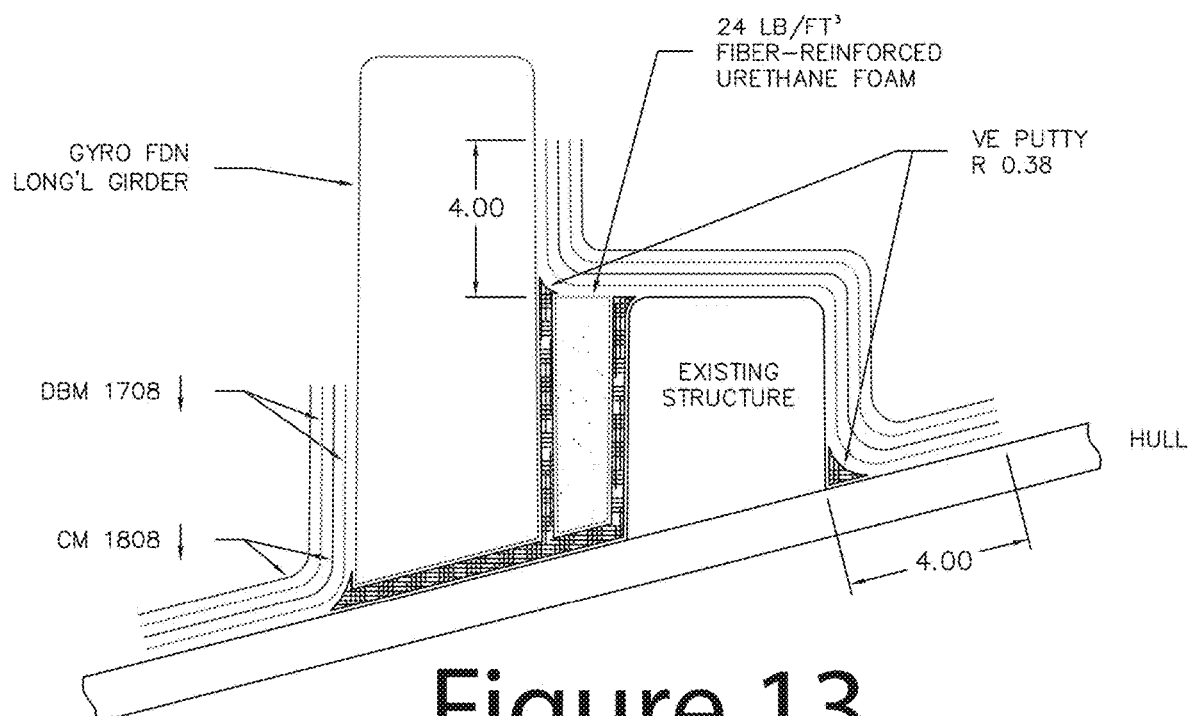
FIG. 13 is a dimensioned sectional view of an embodiment of the inventive foundation support for a vessel gyro-stabilization system showing transverse bracket details as installed between existing hull structure.

FIG. 12 shows an embodiment of the inventive foundation support 10 for a vessel gyro-stabilization system installed in the hull of a vessel between existing hull structure. FIG. 13 is a sectional view of an embodiment of the inventive foundation support 10 for a vessel gyro-stabilization system showing transverse bracket details as installed between existing hull structure. In this installation example, the preformed foundation support 10 is bonded and tabbed over existing adjacent hull structure, which should have less than a 4" gap. In this case, the gap between the trimmed preformed foundation support 10 and the existing adjacent hull structure is filled using a shaped block of fiber reinforced foam, such as Airex PXC. 385 or equivalent. The shaped block is bonded to both the existing adjacent hull structure and the trimmed preformed foundation support 10. Similar to the installations shown in FIGS. 8-11, the longitudinal girders and the transverse brackets can be tabbed to the existing adjacent hull structures and the foam block using fiberglass DBM 1708 Knytex Biaxial +/−45 degree fabric and CM 1808 0/90 degree fiberglass tape, putty, resin, hardener, Cabosil and/or chopped glass fibers.

At least one of the side supports may include a semi-circular cutout 20 for accommodating a spherical gyroscope housing of the vessel gyro-stabilization system and are integrally formed of a molded fiberglass construction. The molded fiberglass construction includes a resin impregnated fiberglass shell having a closed cell foam core, and a metal tapping plate is embedded within the fiberglass shell for fixing the vessel gyro-stabilization system to the preformed foundation support 10. The first and second side supports are longitudinally disposed girders locatable during installation of the preformed foundation support 10 parallel to a longitudinal center line of the vessel running from bow to stern of the vessel.

Figure 14:
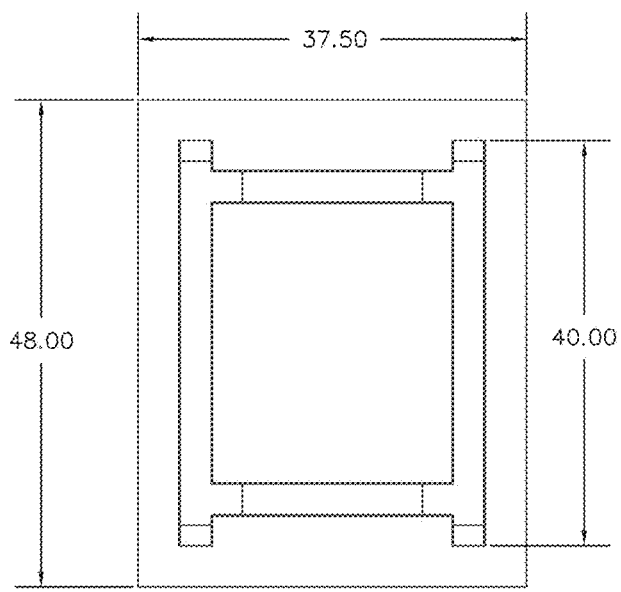
FIG. 14 is a dimensioned top plan view of a mold pattern for an embodiment of the inventive foundation support for a vessel gyro-stabilization system.
Figure 16:
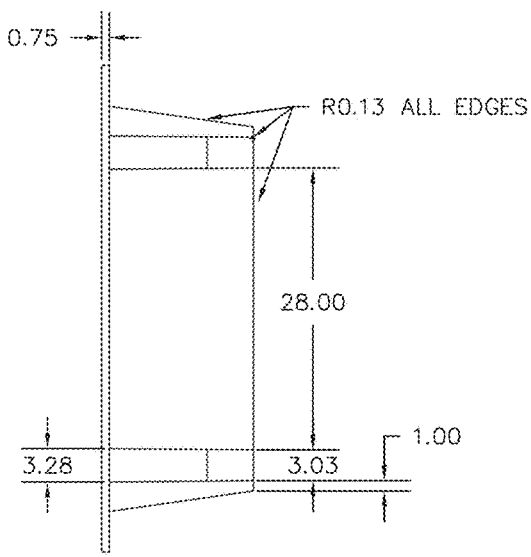
FIG. 16 is a dimensioned end view of the mold pattern for the embodiment of the inventive foundation support for a vessel gyro-stabilization system.
Figure 15:
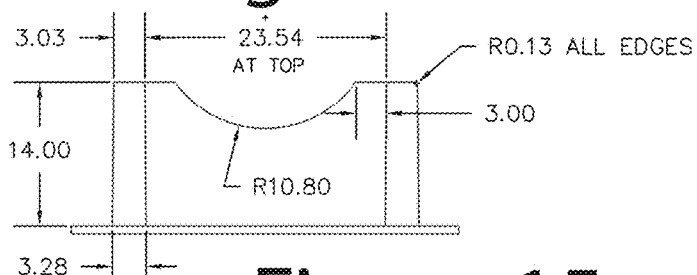
FIG. 15 is a dimensioned side end view of the mold pattern for the embodiment of the inventive foundation support for a vessel gyro-stabilization system.

FIG. 14 is a dimensioned top plan view of a mold pattern for an embodiment of the inventive foundation support 10 for a vessel gyro-stabilization system. FIG. 15 is a dimensioned side end view of the mold pattern for the embodiment of the inventive foundation support 10 for a vessel gyro-stabilization system. FIG. 16 is a dimensioned end view of the mold pattern for the embodiment of the inventive foundation support 10 for a vessel gyro-stabilization system.

In accordance with an embodiment of manufacturing steps, a mold is provided having a mold cavity defining a box shaped cavity having a first side support cavity, a second side support cavity, a third side support cavity, and a fourth side support cavity. A fiberglass shell is laid up within the mold cavity, wherein the fiberglass shell comprises resin impregnated fiberglass cloth and forms a box shaped structure, and wherein the box shaped structure includes a cuttable portion 22 for custom fitting the preformed foundation support 10 in a vessel. To make a strong, stable preformed foundation support 10, a closed cell foam core is disposed within the fiberglass shell. The fiberglass shell can be made up of multiple layers of the resin impregnated fiberglass cloth.

Figure 17:
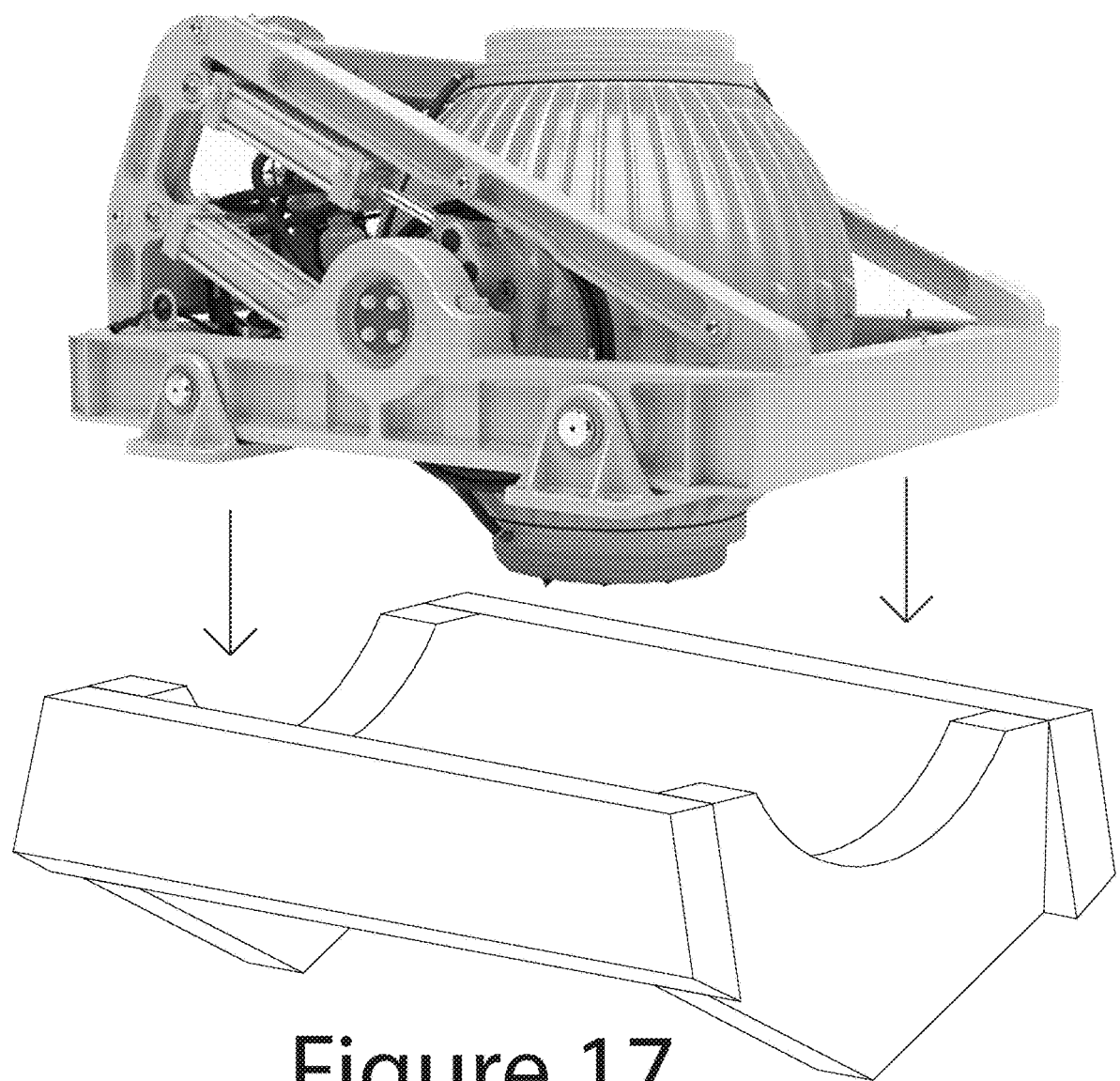
FIG. 17 is a perspective view of a vessel gyro-stabilization system positioned for being installed in the trimmed foundation support for a vessel gyro-stabilization system.

FIG. 17 is a perspective view of a vessel gyro-stabilization system positioned for being installed in the trimmed foundation support 10 for a vessel gyro-stabilization system. Since the gyro-stabilization system metal is typically heavy and generates torque to perform its function, it must be very securely fixed to and supported by the preformed foundation support 10. A tapping plate is embedded within the fiberglass shell for fixing the vessel gyro-stabilization system to the preformed foundation support 10. This tapping plate can be drilled and tapped during the customization of the preformed foundation support 10 to fit the requirements of the particular installation. For example, the location and dimensions of the drilled holes will depend on the location of mating support elements of a particular gyro-stabilization system. Accordingly, the tapping plate is oversized to allow for a proper matchup of the drilled hole location during the installation procedure. The preformed foundation support 10 is installed parallel to the vessel centerline, with the upper surface of the longitudinal girders level. The vessel water plane is leveled (port/starboard, forward/aft) prior to beginning the installation.

Figure 18:
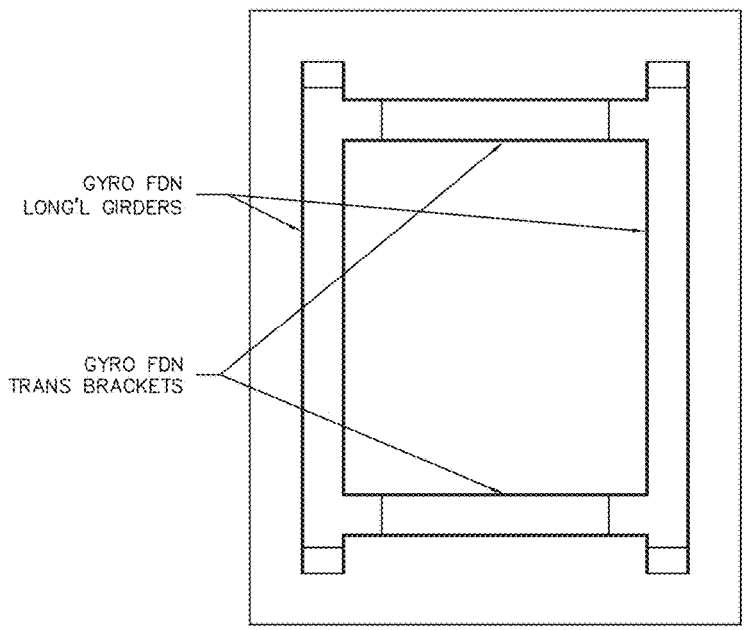
FIG. 18 is a top plan view of a mold pattern for an embodiment of the inventive foundation support for a vessel gyro-stabilization system.
Figure 20:
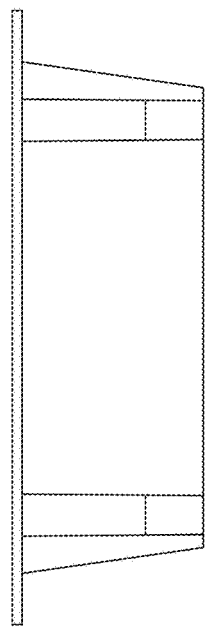
FIG. 20 is an end view of the mold pattern for the embodiment of the inventive foundation support for a vessel gyro-stabilization system.
Figure 19:
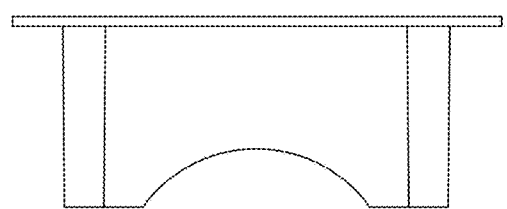
FIG. 19 is a side end view of the mold pattern for the embodiment of the inventive foundation support for a vessel gyro-stabilization system.

FIG. 18 is a top plan view of a mold pattern for an embodiment of the inventive foundation support 10 for a vessel gyro-stabilization system. FIG. 19 is a side end view of the mold pattern for the embodiment of the inventive foundation support 10 for a vessel gyro-stabilization system. FIG. 20 is an end view of the mold pattern for the embodiment of the inventive foundation support 10 for a vessel gyro-stabilization system.

The first and second side supports are formed by laying up the resin impregnated fiberglass cloth and foam core within the mold to form longitudinally disposed girders. These girders are locatable during installation of the preformed foundation support 10 parallel to the longitudinal center line of the vessel running from bow to stern. The girders support the vessel gyro-stabilization system in the vessel along with the similarly formed third and fourth side supports formed as transverse brackets disposed substantially perpendicular to the girders. The mold is configured and dimensioned so that at least one of the side supports includes a semi-circular cutout 20 for accommodating a spherical gyroscope housing of the vessel gyro-stabilization system.

Figure 21:
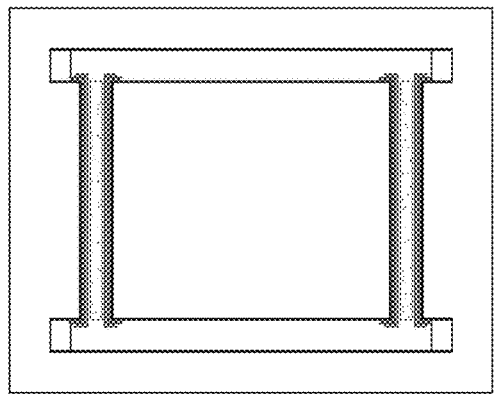
FIG. 21 is a top view of the composite mold showing molded transverse brackets.
Figure 22:
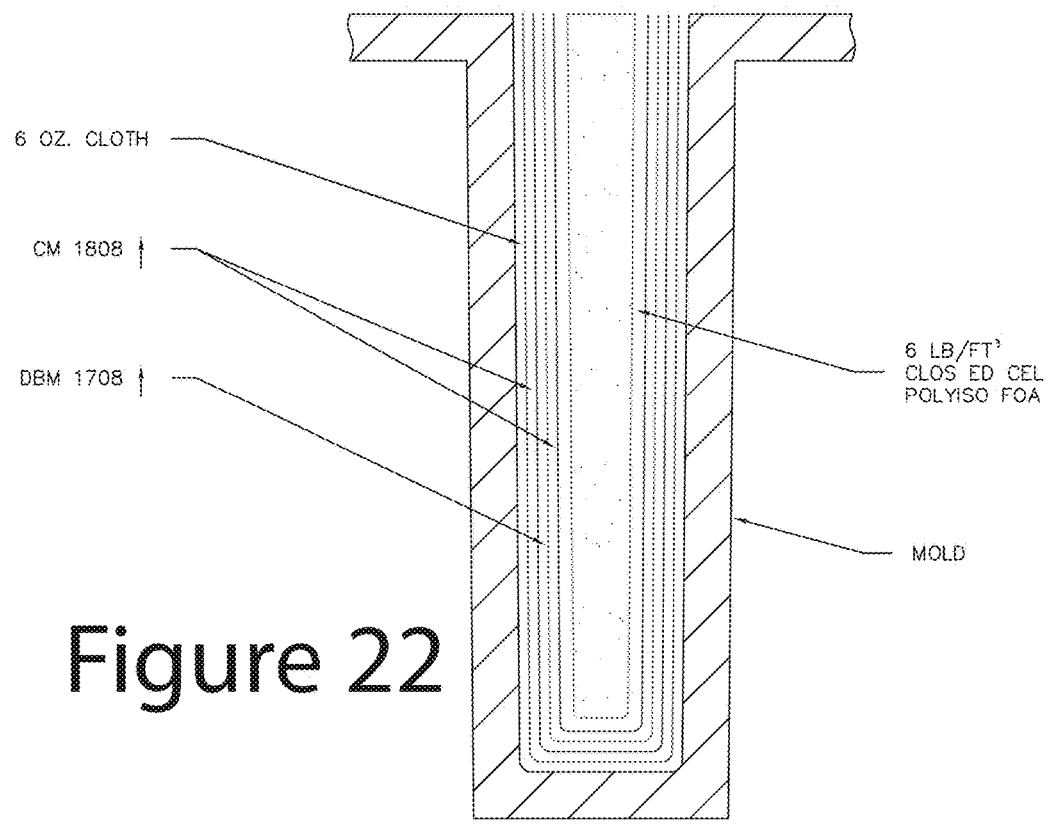
FIG. 22 is a dimensioned cross-sectional view of a section of the composite mold showing a composition of the molded transverse bracket.
Figure 23:
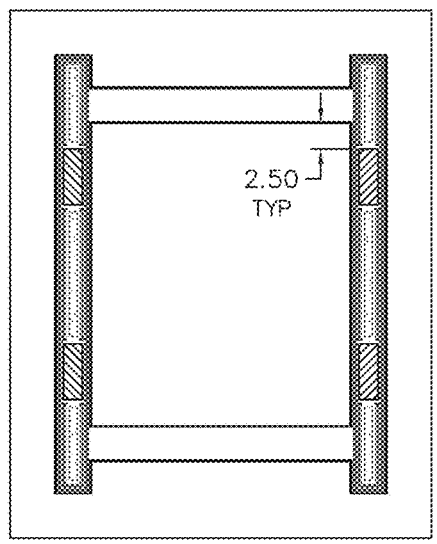
FIG. 23 is a top view of the composite mold showing molded longitudinal girders.
Figure 24:
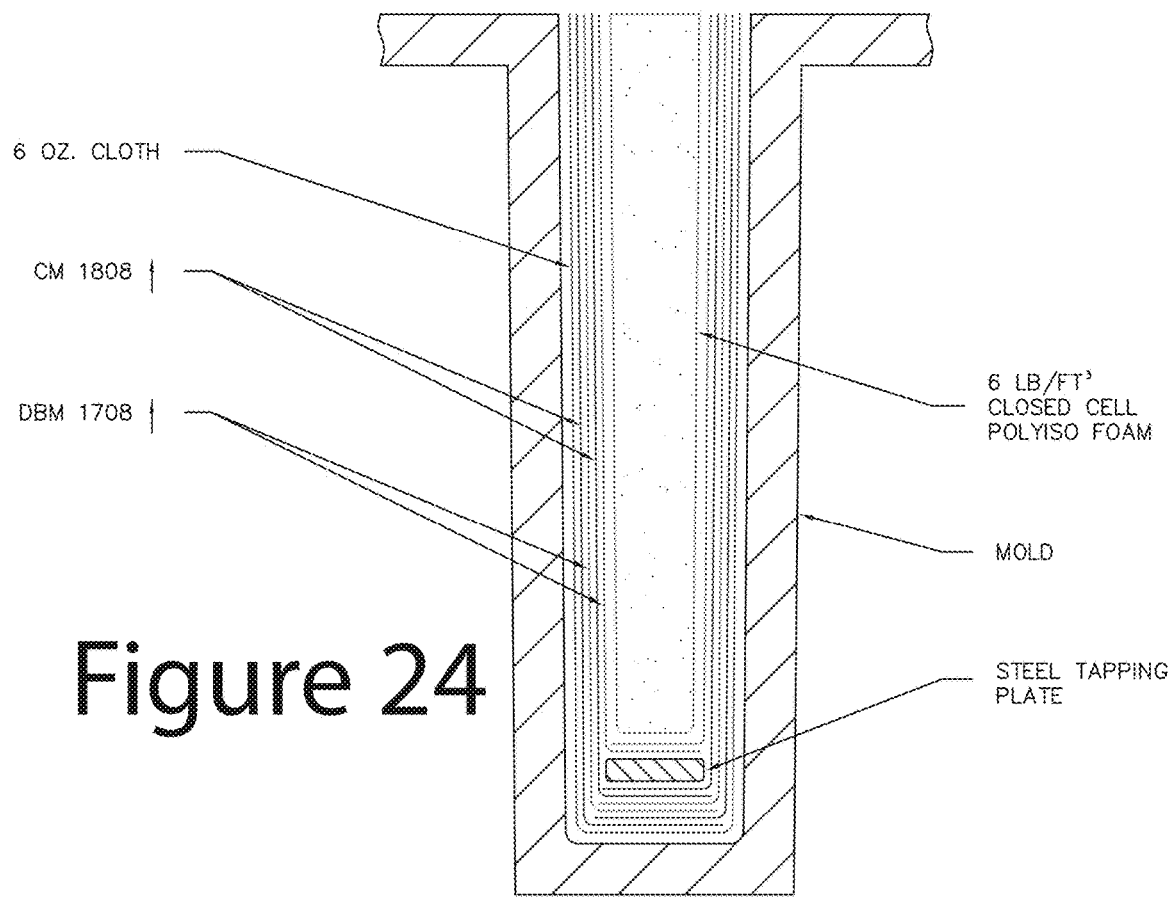
FIG. 24 is a dimensioned cross-sectional view of a section of the composite mold showing a composition of the molded longitudinal girder with steel tapping plate.

FIG. 21 is a top view of the composite mold showing molded transverse brackets. FIG. 22 is a cross-sectional view of a section of the composite mold showing a composition of the molded transverse bracket. FIG. 23 is a top view of the composite mold showing molded longitudinal girders. FIG. 24 is a cross-sectional view of a section of the composite mold showing a composition of the molded longitudinal girder with steel tapping plate.

In an exemplary construction, the transverse brackets of the composite molded preformed foundation support 10 are fabricated with one ply of 6 oz/sq·yard fiberglass cloth; one ply of CM 1808 fiberglass biaxial 0/90 degree (Vectorply E-LTM 1808 or equivalent); one ply of DBM 1708 fiberglass biaxial +/−45 degree (Vectorply E-BXM 1708 or equivalent); and one ply of CM 1808. After laying up the fiberglass layers, a 6 lb/cubic foot close cell polyiso foam (Elfoam P600 or equivalent) is shaped to fit to the transverse brackets. The foam ends are cut flush with the longitudinal girders inboard sides as shown in FIG. 22.

The longitudinal girders of the composite molded preformed foundation support 10 are fabricated with a one ply of 6 oz/sq·yard fiberglass cloth; one ply of CM 1808 fiberglass biaxiam 0/90 degree (Vectorply E-LTM 1808 or equivalent); one ply of DBM 1708 fiberglass biaxil +/−45 degree (Vectorply E-BXM 1708 or equivalent); and one ply of CM 1808. Four 5.5"×2.69"×1" steel tapping plates are inserted as shown in FIG. 24. After laying up the fiberglass layers and inserting the steel tapping plates, a 6 lb/cubic foot close cell polyiso foam (Elfoam P600 or equivalent) is shaped to fit to the transverse brackets. The foam is bonded to the longitudinal girders laminate with putty, resin, hardener, Cabosil and/or chopped glass fibers. After hardening, the composite molded preformed foundation is demolded and made ready for a custom installation.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A preformed foundation support for a vessel gyro-stabilization system generating sufficient torque to stabilize a vessel against rolling of the vessel in waves, comprising:
   a first side support;
   a second side support;
   a third side support; and
   a fourth side support, wherein the side supports define an opening for accommodating at least a portion of the vessel gyro-stabilization system, and wherein at least one of the first, second, third, and fourth side supports comprise a cuttable portion for custom fitting the preformed foundation support in the vessel, wherein the cuttable portion of the side supports are formed of saw cuttable molded fiberglass and cuttable so that the preformed foundation support fits into existing hull structures of the vessel and the cutting of the sides supports fits the preformed foundation support into the existing hull rigidly so that when affixed with bonding material to the existing hull the preformed foundation supports the transfer of force to the existing hull to support the weight and torque of the vessel gyro-stabilization system to reduce rolling of the vessel in waves.

2. The preformed foundation support according to claim 1; wherein at least one of the side supports includes a semi-circular cutout for accommodating a spherical gyroscope housing of the vessel gyro-stabilization system.

3. The preformed foundation support according to claim 1; wherein the first, second, third and fourth side supports are wall integrally formed of a molded fiberglass construction.

4. The preformed foundation support according to claim 3; wherein the molded fiberglass construction includes a resin impregnated fiberglass shell having a closed cell foam core.

5. The preformed foundation support according to claim 4; further comprising a metal tapping plate embedded within the fiberglass shell for fixing the vessel gyro-stabilization system to the preformed foundation support.

6. The preformed foundation support according to claim 1; wherein the first and second side supports are longitudinally disposed girders locatable during installation of the preformed foundation support parallel to a longitudinal center line of the vessel running from bow to stern of the vessel, the girders for supporting the vessel gyro-stabilization system in the vessel, and wherein the third and fourth side supports are transverse brackets disposed substantially perpendicular to the girders.

7. The preformed foundation support according to claim 6; wherein the first, second, third and fourth sidewalls are walls integrally formed of a molded fiberglass construction, the molded fiberglass construction including a resin impregnated fiberglass shell having a closed cell foam core having a metal tapping plate embedded within the fiberglass shell for fixing the vessel gyro-stabilization system to the preformed foundation support.

\* \* \* \* \*